Jan. 9, 1962   A. C. MULDER ET AL   3,016,484
ARC WELDING TRANSFORMER POWER SUPPLY
Filed July 27, 1959   2 Sheets-Sheet 1

INVENTORS
ALLAN C. MULDER
REIDAR P. C. RASMUSEN
BY
Andrus + Starke
Attorneys

Jan. 9, 1962

A. C. MULDER ET AL 3,016,484

ARC WELDING TRANSFORMER POWER SUPPLY

Filed July 27, 1959

INVENTORS
ALLAN C. MULDER
REIDAR P. C. RASMUSEN
BY

*Andrus & Starke*

Attorneys

United States Patent Office 3,016,484
Patented Jan. 9, 1962

3,016,484
ARC WELDING TRANSFORMER POWER
SUPPLY
Allan C. Mulder and Reidar P. C. Rasmusen, Appleton,
Wis., assignors to Miller Electric Manufacturing Company, Appleton, Wis., a corporation of Wisconsin
Filed July 27, 1959, Ser. No. 829,581
18 Claims. (Cl. 321—24)

This invention relates to an adjustable arc welding transformer power supply and is particularly directed to an internally adjustable constant potential transformer having a minimum of reactance in combination with a full-wave rectifier to establish an adjustable direct current suitable for arc welding.

Certain arc welding applications employ a direct current power supply device having an adjustable constant potential output to supply the welding current.

The direct current supply device may include an alternating current transformer having magnetically coupled primary and secondary windings. The primary winding is connected to the conventional 60 cycle incoming power lines and the transformer reduces the relatively high incoming voltage applied to the primary winding to a relatively low voltage which appears across the secondary winding. The low voltage is suitable for maintaining an arc and substantially eliminates the hazards to the welders associated with the higher voltages. To establish a more nearly ripple free direct current, the transformer is conventionally of a three phase design and connected to corresponding three phase power lines. A suitable full-wave rectifier is connected to the output of the transformer to establish the direct current supply.

In a constant potential power supply for arc welding and the like, the maintenance of a constant voltage across the transformer secondary with an arc load connected across the transformer secondary is important to maintenance of a stable arc. That is, the static voltage versus ampere curve ideally is a straight line having a slope approaching zero as nearly as practical.

The degree of magnetic coupling determines the change in voltage across the secondary between open circuit and full load. Consequently, in constant potential power sources the greatest degree of magnetic coupling is essential between the primary and the secondary windings.

Various welding applications within the field of constant potential arc welding require different currents in order to provide the best power and heat inputs to the weld. The current is changed in constant potential units by adjusting the open circuit voltage of the transformer.

Generally, the voltage adjustment is presently made in prior art welding structures by an auxiliary reactance control unit, usually inserted in the secondary circuit of the transformer. The reactance control unit may, for example, include a saturable reactor having a tapped control winding connected in the secondary circuit and suitable direct current excited saturating windings wound on a common core. The reactance of the control winding varies inversely with the direct current excitation of the saturating windings and controls the current flowing in the secondary circuit. The prior art has also employed a reactance control unit having a separate auto-transformer arrangement feeding a main secondary tapped transformer.

The necessary total current range encompassed by the various welding applications is relatively large. Practical arc welding power supplies therefore often have switch means in the secondary circuit to selectively establish various relatively wide current ranges. Fine current adjustment control apparatus operates within each current range and allows precise selection of the required output voltage.

However, the auxiliary reactance control introduces a reactance component into the circuit which applicant has discovered interferes with a stable arc characteristic. The reactance inserted is not linear with current adjustments and consequently introduces an unknown quantity into the circuit.

Alternating current flowing in windings surrounding iron cores cyclically stores and takes energy from the iron associated with the windings. Applicant has found that the stability of the arc is greatly effected by the energy storage per cycle and that the stability of the arc increases as the cyclical stored energy is reduced. The present invention is based on this discovery and the structure produces a greatly reduced energy storage per cycle when compared to prior art construction.

In conventional power systems, the input line voltage does not remain at the precise rated value but varies to either side thereof. The output voltage of a constant potential transformer follows such changes. An arc welding power supply for constant potential welding should therefore be readily adapted to a feed back control which automatically adjusts the voltage output incident to any change in the input voltage.

Further the voltage on the incoming power lines are conventionally either 230 volts or 460 volts. To provide a corresponding output voltage for arc welding, alternate primary winding connections are preferably provided in the machine.

The present invention also provides a constant potential arc welding power transformer having an internally functioning voltage regulation which establishes a minimum stored energy per cycle of welding current.

In accordance with the present invention, a three phase constant potential transformer is constructed of a core assembly having three legs and having the primary and secondary windings of each phase wound in superimposed relation upon a common leg of the core assembly to provide maximum magnetic coupling between the windings. The outermost coil of each phase winding assembly is a portion of the primary winding. One face of each outermost coil is exposed and an electrical contact member is slidably mounted in engagement with the exposed face to selectively connect the outermost coil in the input circuit. As a primary winding normally comprises a relatively large number of turns of a fine conductor, the adjustable contact member establishes fine adjustment of the number of connected turns in the primary circuit and consequently provides fine adjustment of the output voltage. Further, a large number of turns reduces the volts per turn to a level where the contact can be moved between adjacent turns without severe and damaging arcing.

The arc welding transformer of the present invention provides maximum magnetic coupling between the primary and secondary coils and establishes an adjustable transformer having a minimum reactance or energy store per cycle. The current and voltage control is obtained without necessity of a variable auxiliary reactance which would add a non-linear component into the circuit.

Although the static curve of secondary voltage versus welding current is ideally a straight line, dynamically the curve should have a drooping characteristic in order to limit the current incident to the slight changes in the arc voltage. In prior art structures, the auxiliary reactance control served to limit the operating welding current and the transformers normally had sufficient internal react-nce to limit the short circuit current. In accordance with another aspect of the present invention, a small auxiliary reactance is inserted in the secondary circuit to limit the welding current. The transformer may then be constructed with the highest degree of magnetic coupling practically achievable and the current limitation achieved with a known and particularly designed small reactance.

The auxiliary reactance for three phase transformers includes separate core means for each phase to maintain symmetrical flux paths between the opposite half cycles. The welding current then contains an even symmetrical ripple component which does not noticeably affect the arc.

In accordance with another exceptionally important aspect of the present invention, each of the phase windings is divided into two similar individual units wound on a common leg and includes a secondary, a main primary portion and the slide wire portion. The primary coils are connected in Y. The two individual units per phase are readily interconnected in series or in parallel with each other and to the incoming power supply in accordance with the incoming voltage supply. The welding power supply can therefore be readily connected to power lines of different voltages with simple and accurate control of the current.

The slide wire adjustment may be established manually or automatically. Suitable feed back controls may be employed to readjust the slide wire and compensate for changes in the incoming line voltage.

The present invention consequently provides a compact and efficient arc welding transformer of the dual voltage variety having a minimum reactance in the primary circuit and in the secondary circuit of the transformers. The arc welding transformer of the present invention is truly a constant potential welding source and creates an exceedingly stable arc and a correspondingly sound weld.

In accordance with still another aspect of the invention as applied to direct current power sources, a wide selection of voltage and current ranges is established by a minimum number of tap or switch means on the secondary winding of the transformer. Opposite ends of the secondary winding are adapted to be selectively and individually connected to an input terminal of a full-wave rectifier. The selective connection of the opposite ends of the transformer secondary to the full-wave rectifier provides a pair of voltages for each tap on the secondary. The instantaneous current input to the full-wave rectifier changes with the alternate wide-range connection and changes the conduction of the rectifiers within the rectifier unit. However, because the current from a full-wave rectifier is not affected in any way by which of the rectifying units is then conducting the current to the arc, the simultaneous instantaneous change in current flow through the rectifier assembly is not detected in any manner at the load.

The dual range tap switch construction is consequently particularly adapted for establishing a wide current range control in direct current arc welding power sources. The tap switch is more particularly useful in combination with the sliding contact control of the present invention which has a relatively small range of fine adjustment and consequently requires a greater number of separate basic ranges.

The present invention provides an integral constant potential arc welding transformer structure particularly directed to reducing the reactance of the circuit and consequently the energy store per cycle. The transformer can be completely internally controlled and establishes an essentially constant potential output having a very minimum voltage drop between open circuit voltage and full load voltage or even overload voltage.

The single core assembly permits a wide selection of voltage through the combination tapped secondary and slide wire type primary with a minimum amount of copper. Consequently, the energy stored per cycle is held to a minimum and an exceedingly stable arc is established. The small energy storage also results in a very rapid time response.

The transformer core unit of the present invention is relatively small compared to prior art welding machines and is therefor lighter and less expensive. Further, the reduced weight makes the welding unit more portable.

The drawings furnished herewith illustrate the best mode presently contemplated for carrying out the invention.

Figure 1:
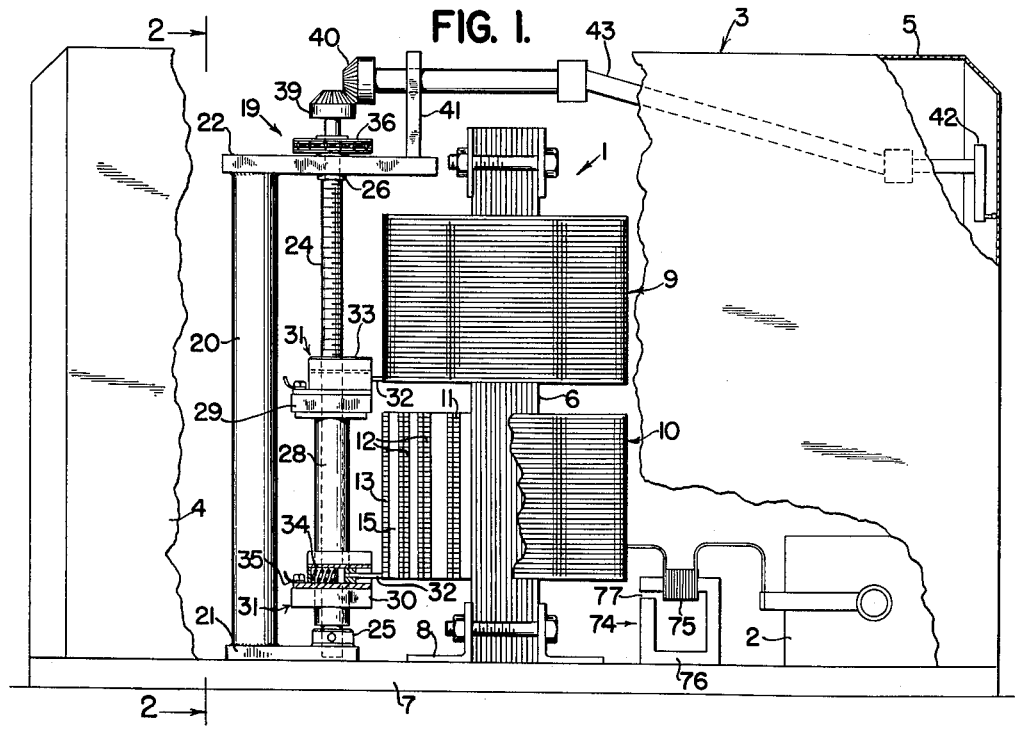
FIG. 1 is a side elevational view of a direct current power unit constructed in accordance with the present invention.

Referring particularly to FIG. 1 of the drawings, a constant potential arc welding power supply is shown generally comprising a three phase transformer 1 adapted to be connected to an alternating current power system to supply alternating current at a suitably reduced voltage to a full-wave rectifier assembly 2. The transformer 1 and rectifier assembly 2 are mounted within a suitable supporting and enclosing housing 3. A portion of a side panel 4 and a top panel 5 of the housing 3 are broken away to generally show the transformer 1 and the rectifier assembly 2. The preferred circuit connections of transformer 1 and rectifier assembly 2 are shown in FIG. 4.

Figure 2:
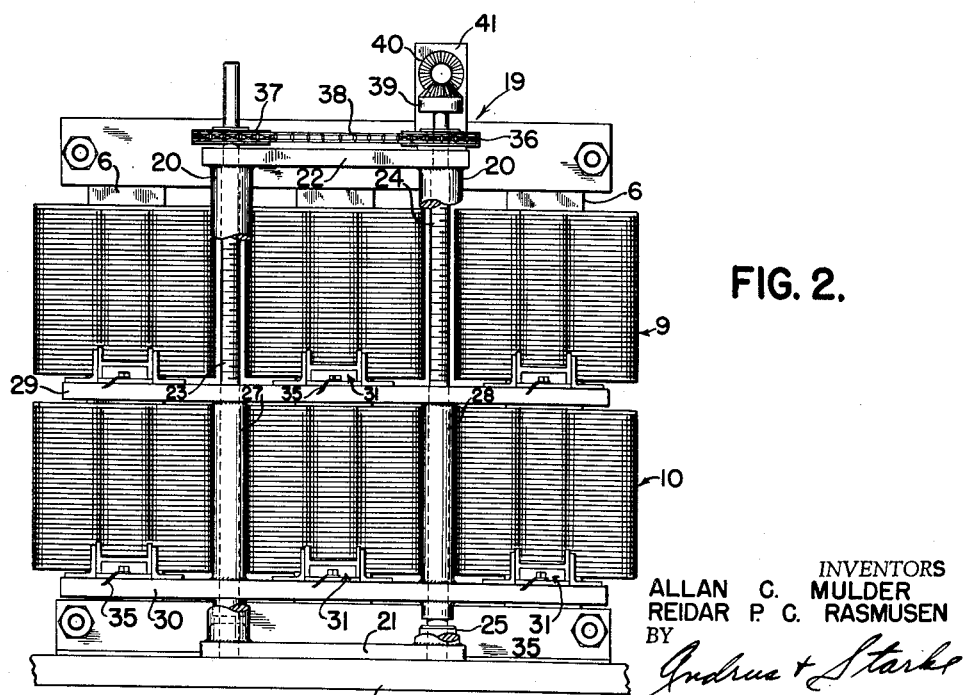
FIG. 2 is a view taken on line 2—2 of FIG. 1.

Referring particularly to FIGS. 1 and 2, the illustrated three-phase transformer 1 includes an integral three leg core 6 which is secured in a vertical position upon a base structure 7 of housing 3. Suitable clamping brackets 8 are welded to base structure 7 and clamped about the bottom of the core to rigidly support the transformer 1 within the housing 3. A pair of vertically stacked coil assemblies 9 and 10 are mounted on each leg of the three-leg core 6.

Figure 4:
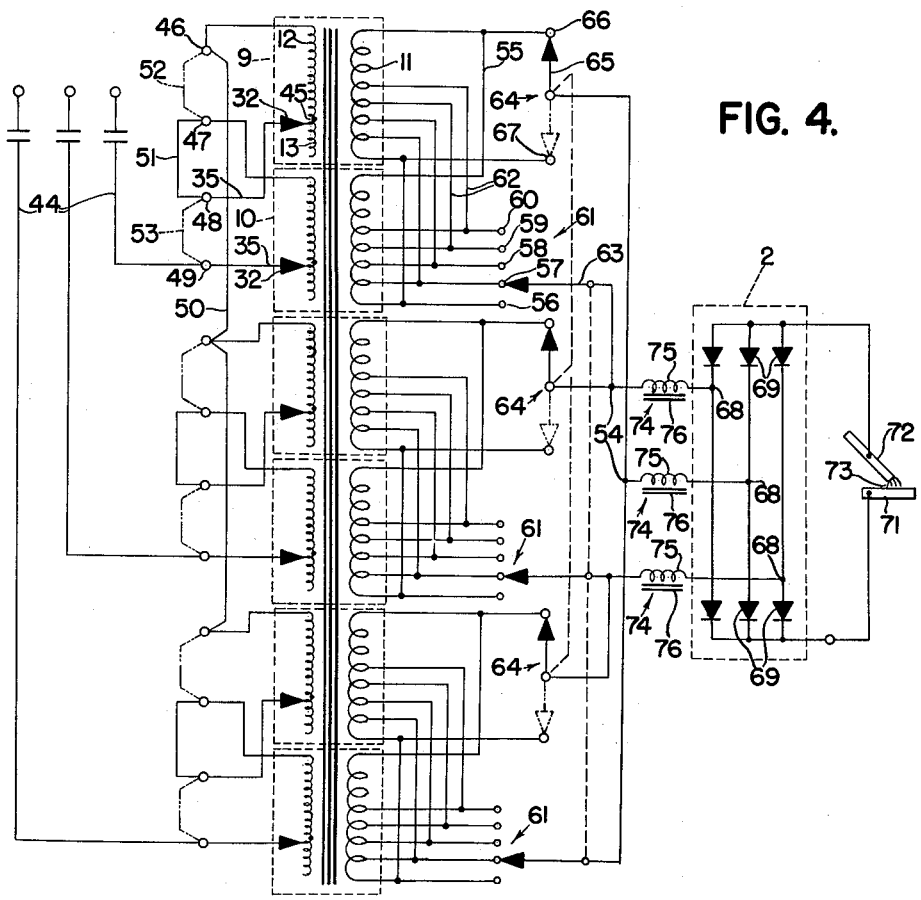
FIG. 4 is a schematic circuit diagram of the transformer and rectifier shown in FIGS. 1–3.

Each pair of coil assemblies 9 and 10 is interconnected to a different phase of an incoming three-phase power supply, not shown, and to a different input connection of rectifier assembly 2, as schematically shown in FIG. 4. Each of the coil assemblies 9 and 10 is similarly constructed and a detailed description of only one is set forth.

Figure 3:
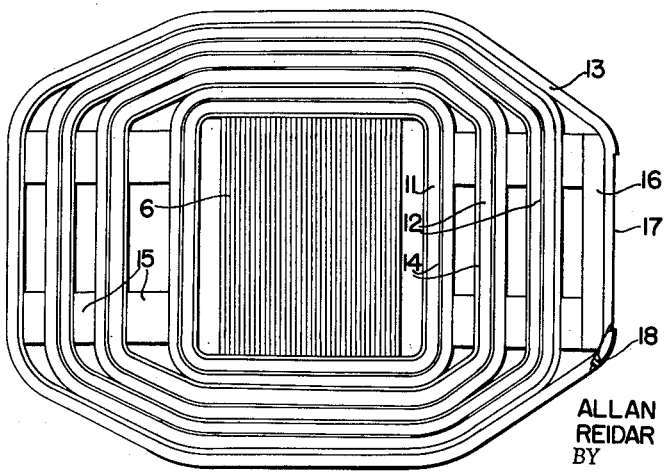
FIG. 3 is an enlarged diagrammatic illustration of one coil assembly of the transformer shown in FIGS. 1 and 2.

A diagrammatic cross sectional view of one coil assembly is shown in FIG. 3.

Referring particularly to FIG. 3, each of the coil assemblies 9 and 10 includes a double-layer multi-turn secondary coil 11 of a relatively heavy conductor which is prewound and disposed about a leg of the core 6. The secondary coil 11 is slightly spaced from core 6 to allow air cooling of the coil 11 and core 6.

A main primary coil, including two series-connected double-layer multi-turn coils 12 of a relatively light conductor, is pre-wound and concentrically disposed about the secondary coil 11. A single-layer, slide-wire primary coil 13 also of a relatively light conductor is concentrically pre-wound about the main primary coils 12 as an integral extension of the main primary coils 12.

The main primary coils 12 constituted a fixed minimum reactive impedance which prevents excessive current flow in the primary winding. Current control is obtained by adjustably adding the slide-wire primary coil 13 and the corresponding reactive impedance to the coil 12. Consequently, the primary coil arrangement eliminates the danger of coil burn out under all normal operation.

Suitable insulating material 14 is disposed between immediately adjacent coil layers to insulate the adjacent coil turns in the several layers. Relatively large insulating blocks 15 are disposed between the concentric coil units on one set of opposite sides of the leg of core 6 to establish air circulating paths for cooling of the transformer and to allow space for suitable tap connections to the secondary coil 11. The insulating blocks 15 extend vertically generally co-extensively with each of the corresponding coil assemblies 9 and 10 to form a strong and rigid unit.

An insulating plate 16 is disposed between one set of the outermost insulating blocks 15 and the back surface of the outer slide wire primary 13 to back up the immediately adjacent coil turns, as shown to the right in FIG. 3. A narrow vertical surface 17 of the slide wire primary coil 13 immediately aligned with the backing plate 16 is ground flat and smooth to remove the insulating varnish 18 which coats the conductors forming the several coils, as shown greatly enlarged in FIG. 3. The flat surface 17 constitutes a sliding track for an adjacent slide wire brush assembly 19, shown in FIGS. 1 and 2.

The slide wire assembly 19 includes a pair of laterally spaced supporting posts 20 secured to the base 7 of housing 5 and projected vertically upwardly in spaced relation to the core 6. A cross plate 21 is welded or otherwise rigidly secured to the lower end of posts 20 and the base 7 of the housing 5 and extends toward core 6. A similar plate 22 is welded or otherwise secured to the upper ends of the posts 20 and extends parallel to the plate 21 toward the transformer core 6. A pair of lead screws 23 and 24 are generally spaced in accordance with the vertical posts 20 and rotatably supported in lower radial and thrust bearings 25 on the lower cross plate 21 and radial bearings 26 on the upper cross plate 22.

Tubular internally threaded followers 27 and 28 are threaded one each on each of the lead screws 23 and 24. The two followers 27 and 28 have an axial dimension generally corresponding to the vertical dimension of each of the individual coil assemblies 9 and 10. Upper and lower insulating cross braces 29 and 30 are rigidly secured respectively to the upper and the lower ends of the tubular followers 27 and 28. The cross braces 29 and 30 are thus vertically spaced in accordance with the spacing of corresponding coil turns of the upper and lower coil assemblies 9 and 10. The cross brackets 29 and 30 are formed of a relatively thick asbestos material or some other similarly structurally supporting and electrically insulating medium.

Three duplex brush units 31 are bolted or otherwise rigidly secured to the upper surfaces of the insulating cross braces 29 and 30 in alignment with each of the flat surfaces 17 of the primary slide-wire coil 13. Each coil 9 and 10 is thereby provided with a brush unit 31 physically connected to the other brush units for simultaneous and corresponding positioning.

Each brush unit 31 includes an electrical brush contact 32 of carbon or other suitable material. The contact 32 is supported in a box-like bracket 33 for horizontal movement into engagement with the adjacent slide wire surface 17. The coil engaging face of each brush 32 is generally rectangular in shape having a width corresponding to the width of the coil surface 17 and a vertical depth generally corresponding to the diameter of the wire forming the slide wire primary coil 13. A small coil spring 34 is disposed between the base of each bracket 33 and the back edge of the brush contact 32 to resiliently hold the contact 32 in firm electrical engagement with the adjacent slide wire surface 17.

Brush leads 35 are connected to the duplex brush units 31 and consequently to the contacts 32 to connect the slide wire primary coil 13 in circuit, as diagrammatically shown in FIG. 4, in accordance with the vertical positioning of the followers 27 and 28.

The lead screws 23 and 24 are simultaneously rotated to selectively position the followers 27 and 28 and the attached brush units 31 on the several individual coils 9 and 10 in the illustrated embodiment of the invention as follows.

Referring particularly to FIGS. 1 and 2, suitable sprockets 36 and 37 are secured to an upper projection of the lead screws 23 and 24 immediately above the upper cross plate 22. A chain 38 meshes with the sprockets 36 and 37 to establish corresponding rotation of the two lead screws 23 and 24.

A driven gear 39 is secured to the upper end of the lead screw 24. A drive gear 40 is supported in mesh with the driven gear 39 by a suitable bearing bracket 41 on the cross plate 22. A manually adjustable crank 42 is rotatably mounted externally of the front portion of the housing 3 and is connected by a suitable shaft 43 to the drive gear 40. The rotation of crank 42 is consequently transmitted to the lead screws 23 and 24 to simultaneously position the followers 27 and 28 and the brush units 31 with respect to the primary slide wire coils 13.

In accordance with the illustrated embodiment of the invention, the transformer primary coils 12 and 13 are connected to a set of three phase alternating current power lines 44 and the secondary windings 11 are connected to the rectifier 2, as shown in FIG. 4 of the drawings, to establish a direct current output suitable for arc welding.

The several pairs of coil assemblies 9 and 10 are shown in FIG. 4 in vertically arranged relationship. Each pair is similarly connected and therefore only one pair is described in detail.

The slide wire primary coil 13 and the main primary coil 12 have a common connection 45. The opposite end of each pair of main primary coils 12 constitutes a pair of input terminals 46 and 47. The brush leads 35 constitute a second pair of input terminals 48 and 49 in each of the coil assemblies 9 and 10.

The input terminals 46–49 are adapted to be selectively connected the set of three phase power lines 44 for connection to a 460 volt three phase power source.

The alternative connection to a 230 volt source is shown in phantom in FIG. 4. Jumper leads 52 connect the terminals 46 and 47 and jumper leads 53 connect the terminals 48 and 49. Consequently, the primary coils of coil assemblies 9 and 10 are connected in parallel.

The volts per turn of the primary windings remain constant with either connection as the voltage applied to the full line connection is twice the voltage applied to the phantom line connection of FIG. 4. Consequently, the voltage appearing across the output circuit is the same in either connection for a corresponding positioning of brush contacts 32.

The secondary coils 11 are connected in a delta circuit, that is, forming a closed loop with three output terminals 54 defined by the connecting junctions of the three phase coils.

A jumper lead 55 connects one corresponding end of each pair of secondary coils 11 in each pair of coil assemblies 9 and 10. A series of switch contacts 56–60 of a tap switch 61 are connected to the several successive turns in the half of the secondary coil 11 of coil assembly 10 opposite the common connection established by jumper lead 55, in the illustrated embodiment of the invention. A plurality of jumper leads 62 connect the contacts 56–60 to the corresponding winding turns in the upper secondary coil 11 of coil assembly 9. A contact arm 63 of switch 61 is adapted to be selectively positioned in engagement with the series of contacts 56–60 to vary the portion of coils 11 to be connected in circuit and to accordingly change the output voltage from the transformer 1. Each of the switch arms 63 of the several coil assemblies 9 and 10 is connected to a different one of the transformer output terminals 54 to selectively connect an adjustable number of turns of the secondary coils 11 to the corresponding output terminals 54.

The switch arms 63 are ganged for simultaneous movement to corresponding positions on the secondary coils 11 such that the same turns in each of the secondary coils is automatically connected to the corresponding output terminal.

A high-low range switch 64 includes a switch arm 65 which is connected to an output terminal 54. Switch 64 includes a pair of contacts 66 and 67 connected respectively to the upper and lower ends of the upper secondary coil 11 of coil assembly 9. When the switch arm 65 engages the upper contact 66, as shown in full line in FIG. 4, the complete secondary coil 11 may be connected to the output terminals 54 by positioning of the tap switch arm 63 of the tap switch 61 in engagement with the lowermost contact 56 of the lower secondary coil. As the switch arm 63 is moved selectively into engagement with the contacts 57–60, a reduced number of secondary turns are connected in circuit and consequently the output voltage is accordingly decreased. When the contact arm 63 engages contact 60, the minimum voltage output obtainable with switch arm 65 engaging contact 66 is obtained.

In order to reduce the voltage further, the switch 64 is actuated to dispose the switch arm 65 in engagement with contact 67 as shown in phantom in FIG. 4. This effectively disconnects the portion of the secondary coil above the contact 60. Now, movement of the intermediate tap switch 61 downwardly from contact 60 to the lowermost contact 56 reduces further the number of turns of the secondary coils connected in circuit and further reduces the output voltage.

The above movement of the arm 63 of switch 61 in an opposite direction to reduce the number of turns in effect simulates a connection to the additional turns on the upper portion of the secondary windings. Consequently, by the single expedient of a two-position switch 65 the tap switch 61 serves to function in an opposite direction in the two ranges and establishes a pair of output voltages for each setting of switch 61. The total number of taps necessary to provide a given number of different voltage ranges is consequently substantially reduced.

The switch arms 65 are ganged to establish simultaneous and corresponding positioning with respect to the associated contacts 66 and 67.

The positioning of the dual range switch 64 between the low and high current positions changes the instantaneous polarity of the voltage supplied to the rectifier assembly 2. However, the output from the rectifier assembly 2 is a direct current and a load cannot detect which of the several rectifying paths in the full wave rectifier 2 is then supplying the current. Consequently, the change in polarity is not reflected in the direct current output.

The bridge rectifier 2 is schematically shown as having three input terminals 68 connected to the transformer output terminals 54. Six banks of rectifying elements 69, diagrammatically shown, are connected in a conventional paralleled-series connection to establish a pair of direct current output terminals 70.

The elements 69 conventionally include a plurality of metallic rectifier plates connected in series-parallel to provide a sufficient current carrying capacity.

A workpiece 71 is connected to one output terminal 70 and an arc welding electrode 72 is connected to the opposite terminal. Upon suitable engagement of the electrode 72 and the work 71, an arc 73 is established to effect a welding operation.

A small stabilizing reactor 74 is inserted between each of the paralleled secondaries 11 and the corresponding input terminal 68 to rectifier 2. Referring particularly to FIGS. 1 and 4, each reactor 74 includes a reactance winding 75 connected in series with the input terminal 68. The winding 75 is wound on a small rectangular core 76 having an air gap 77. An eighth inch air gap has produced highly satisfactory results in actual construction.

The reactor 74 controls the dynamic characteristic of the arc current and stabilizes the arc 73. Individual reactor cores 76 are employed in the three phases to maintain symmetrical flux paths during each half cycle of the current. Thus, if a single 3 leg core similar to the transformer core 6 is employed, several possible flux paths are provided for each reactance winding. The resultant output welding current then includes asymmetrical ripple component which adversely affects the stability of the arc. The use of three individual cores 76 results in an even ripple component in the arc welding current and establishes a smooth, stable arc 73.

The summary of the illustrated embodiment of the invention is described as follows:

Assume the power connecting lines 44 are to be connected to the conventional power line system adapted to furnish 230 volt power or 460 volt power. The primary coils 12 and 13 and the secondary coils 11 are selected to establish a suitable output voltage for arc welding with the prescribed input voltage.

If the apparatus is to be connected to power lines providing 460 volt power, the primary coils 12 and 13 of each of the coil assemblies 9 and 10 are connected in series by the jumper lead 51, as shown in full line in FIG. 4.

However, if the incoming power lines, not shown, present 230 volt power, the corresponding primary coils 12 and 13 of each of the coil assemblies 9 and 10 are connected in parallel, as shown in phantom by jumper leads 52 and 53.

Consequently, the same voltage per primary turn is established because with the lower voltage only half the number of turns are connected directly across the incoming power source. Consequently, the voltage appearing across the secondary coil 11 is the same for either connection and a voltage suitable for arc welding is maintained.

The tap switch 64 constitutes the high and low range selector switch. When arm 65 of switch 64 engages contact 66, the full secondary coils 11 are connected in circuit. However, when arm 65 engages contact 67 only the lower half portion of the illustrated secondary coils 11 are in circuit. The tap switch 64 thus establishes a pair of possible voltages on each of taps 56–60. One voltage for the high range and another for the low range. In practice, the ranges normally overlap somewhat.

The tap switch 61 thus further divides the high and the low ranges into a series of sub ranges. The combination of the selector switch 64 and the tap switch 61 provides a large number of welding current ranges with a minimum number of taps.

After selecting the desired range and sub-range within which the welding operation is to be performed, the crank 42 is actuated to position the brushes 31 and precisely establish a preselected welding current. The calibration of the secondary voltage is the same for both the 230 volt and the 460 connection.

The slide wire control or brush assembly 19 for the primary slide wire coils 13 allows practically infinite voltage adjustment within each and every arc welding current range. The control is relatively simple and inexpensive while establishing a high degree of accuracy.

The fixed main primary coils 12 maintain a minimum impedance in the primary circuit and inadvertent adjustment which would establish dangerously high current cannot possibly be made if the correct line connection is established.

The split coil assemblies 9 and 10 provide maximum coupling between the primary and secondary coils and provide a series parallel system for selectively connecting the primary coils to a base voltage and to a double base voltage. Further, the circuit includes low resistance and the resulting power loss is therefore relatively small.

As previously noted, the positioning of the selector switch 64 changes the instantaneous current flow with respect to the rectifying elements 69 of rectifier assembly 2. However, the output of the full wave rectifier assembly 2 is independent of the polarity of the instantaneous input and consequently the arc current is for all practical purposes unchanged. The present invention is thus particularly adapted for application to direct current arc welding supplies.

The description of the several coils as being wound on the core does not limit the construction to coils which are formed by winding the conductor wire about the core. The coils are, in fact, normally preformed or wound and then disposed or mounted on the core and the term "wound" as employed in this specification includes such winding formation.

Although not illustrated, an automatic voltage control to compensate for variations in the incoming voltage may be readily applied to reposition the brushes 32 or the like incident to changes in the voltage. Thus, a positioning motor may be coupled to drive the screws 23 and 24 and operatively connected by a suitable voltage sensing device to the incoming power lines.

The dual range switch 64 and the tap switch 61 establish a simple and ready means for selecting various voltage ranges. The slide wire assembly and the slide wire control on the primary coil permit fine adjustment of the voltage output within each range which is applied to the input of the full-wave bridge type rectifier 4. The tap switch control and the slide wire control thus provide an inexpensive wide range current control.

The primary coils and the secondary coils are wound to allow selective connection in accordance with the incoming line voltage while maintaining a high degree of magnetic coupling.

The construction of the present invention is simple and rugged and is therefore particularly adapted for commercial usage.

A variable output voltage constant potential arc welding transformer is provided by the present invention with a simple and fully internal adjustment. Consequently, a small and efficient unit is provided. The stacked construction of the windings allows dual voltage connection without interference with the maintenance of the desired close coupling and resulting minimum internal reactance.

Various modes of carrying out the invention are contemplated as being within the scope of the following claims particularly pointing out and distinctly claiming the subject matter which is regarded as the invention.

We claim:

1. In an arc welding apparatus having a three phase input transformer adapted to be connected to incoming power lines and an output rectifier connected to the transformer to establish a direct current output suitable for arc welding, said transformer having three winding assemblies each having a pair of primary coils and a pair of secondary multi-turn coils, each primary coil including a multi-turn slide wire portion and a main winding portion connected in series, the ends of the main winding portions constituting first and second primary terminal means to each winding assembly, individual contact means slidably engaging said slide wire portions to establish a third and a fourth primary terminal means to each winding assembly related respectively to said first and second primary terminal means, said first terminal of each of said three winding assemblies being connected to form a common junction of a three phase Y connection, said fourth terminal means of each winding assembly being adapted to be connected to the incoming power lines, said second and third terminals in each primary coil being adapted to be selectively connected to each other to establish a series connection and to the corresponding first and second terminal means to establish a parallel connection, each of said pair of secondary coils being connected in parallel, switch means adapted to selectively connect opposite ends of the paralleled secondary coils to said output rectifier, and tap switch means to individually connect a plurality of turns of the secondary coils to the output rectifier to vary the portion of the secondary coils connected in circuit.

2. An arc welding power supply having a three-phase transformer and a full wave rectifier, said transformer including three winding assemblies, which comprises a pair of primary coils in each winding assembly, each primary coil including a multi-turn slide wire portion and a main winding portion connected in series, the ends of the main winding portions constituting first and second primary terminal means to each winding assembly, individual contact means slidably engaging said slide wire portions to establish third and fourth primary terminal means to each winding assembly related respectively to said first and second terminal means, said first terminal means being connected to form a common junction of a three-phase Y connection, said fourth terminal means being adapted to be connected to incoming power lines, said second and third terminal means being adapted to be selectively connected to each other to establish a series connection of said primary coils in each winding assembly and to the corresponding first and second terminal means to establish a parallel connection of said primary coils in each winding assembly, a pair of multi-turn secondary coils in each winding assembly closely magnetically coupled one each to each of the primary coils, each pair of secondary coils being connected in parallel, switch means adapted to selectively connect opposite ends of the paralleled secondary coils to the full wave rectifier, contacts connected to corresponding turns on one half of the paralleled secondary coils, and a contact arm connected to the full wave rectifier and adapted to selectively engage said contacts to vary the portion of the secondary coils connected in circuit.

3. A direct current arc welding power source including a full wave rectifier and a three phase transformer having three similar winding assemblies, which comprises a three legged magnetic core, a pair of primary coils and a pair of multi-turn secondary coils in each of said winding assemblies concentrically wound in stacked relation on an individual leg of the core, each primary coil including an outer multi-turn slide wire portion and a main winding portion concentrically wound and connected in series, the ends of the main winding portion constituting first and second primary terminal means to each winding assembly, individual contact means slidably engaging said outer slide wire portions to establish a third and fourth primary terminal means to each winding assembly related respectively to said first and second primary terminal means, all of said first primary terminal means being connected to form a common junction, said fourth primary terminal means being adapted to be connected to the incoming power lines, said second and third primary terminal means being adapted to be selectively connected to each other to establish a series connection of said pairs of primary coils and to the corresponding first and second primary terminal means to establish a parallel connection of said pairs of primary coils, each of said pairs of secondary coils being connected in parallel, switch means constituting an output terminal means connected to said full wave rectifier and adapted to be selectively connected to opposite ends of the paralleled secondary coils, and tap switch means constituting a second output terminal means connected to said full wave rectifier and adapted to be connected to a series of corresponding turns of the secondary coils to vary the portion of the secondary coils connected in circuit.

4. In a direct current arc welding supply including a three phase transformer having three similar phase winding assemblies and a full wave rectifier connected to the output of the transformer, a vertically mounted three-legged core assembly, each of said winding assemblies having a pair of primary coils and a corresponding pair of secondary coils concentrically wound on an individual leg of the core assembly, the secondary coils being wound in stacked relation on a core leg, each primary coil including a main winding portion superimposed on the secondary and an outer superimposed slide wire portion connected in series with the main winding portion, said slide wire portions including contact surfaces exposing the several turns of the slide wire portion, the ends of the main winding constituting first and second terminal means to each primary coil, individual contact means slidably engaging said contact surfaces and establishing third and fourth terminal means to each primary coil related respectively to said first and second terminal means, lead screw means adjustably supporting said contact means, drive means coupled to said lead screw means to simultaneously position said contact means, said first terminal means being connected to form a common junction, said fourth terminal means being adapted to be connected to the incoming power lines, said second and third terminals being adapted to be selectively connected to each other to establish a series connection of said primary coils and to the corresponding first and second terminal means to establish a parallel connection of said primary coils, said pair of secondary coils being connected in parallel, switch means adapted to selectively connect opposite ends of the paralleled secondary coils to establish three output terminals, contacts connected to corresponding turns on one half of each pair of the paralleled secondary coils, and contact arms connected to said output terminals and adapted to selectively engage said contacts on a secondary coil pair different from the corresponding switch means to vary the portion of the secondary coils connected in circuit.

5. In an arc welding apparatus having a three phase input transformer adapted to be connected to incoming power lines and an output rectifier connected to the transformer to establish a direct current output suitable for arc welding, said transformer having three winding assemblies each having a pair of primary coils and a pair of secondary multi-turn coils, each primary coil including a multi-turn slide wire portion and a main winding portion connected in series, the ends of the main winding portions constituting first and second primary terminal means to each winding assembly, individual contact means slidably engaging said slide wire portions to establish a third and a fourth primary terminal means to each winding assembly related respectively to said first and second primary terminal means, said first terminal of each of said three winding assemblies being connected to form a common junction of a three phase Y connection, said fourth terminal means of each winding assembly being adapted to be connected to the incoming power lines, said second and third terminals in each primary coil being adapted to be selectively connected to each other to establish a series connection and to the corresponding first and second terminal means to establish a parallel connection, each of said pair of secondary coils being connected in parallel, switch means adapted to selectively connect opposite ends of the paralleled secondary coils to said output rectifier, tap switch means to individually connect a plurality of turns of the secondary coils to the output rectifier to vary the portion of the secondary coils connected in circuit and a reactor assembly including three individual windings connected one each in series with the secondary windings and the rectifier.

6. In an arc welding apparatus having a three-phase input transformer adapted to be connected to incoming power lines and an output rectifier connected to the transformer to establish a direct current output suitable for arc welding, said transformer having three winding assemblies each having a pair of primary coils and a pair of secondary multi-turn coils, each primary coil including a multi-turn slide wire portion and a main winding portion connected in series, the ends of the main winding portions constituting first and second primary terminal means to each winding assembly, individual contact means slidably engaging said slide wire portions to establish a third and a fourth primary terminal means to each winding assembly related respectively to said first and second primary terminal means, said first terminal of each of said three winding assemblies being connected to form a common junction of a three phase Y connection, said fourth terminal means of each winding assembly being adapted to be connected to the incoming power lines, said second and third terminals in each primary coil being adapted to be selectively connected to each other to establish a series connection and to the corresponding first and second terminal means to establish a parallel connection, each of said pair of secondary coils being connected in parallel, switch means adapted to selectively connect opposite ends of the paralleled secondary coils to said output rectifier, and three individual reactors one each for each of said phase winding assemblies, each of said reactors including a rectangular frame having a small air gap and a winding wound on said frame and connected in series with the corresponding secondary windings and the rectifier.

7. In an arc welding supply having a three phase transformer having three similar phase winding assemblies mounted on a multi-leg core assembly, each of said winding assemblies having a pair of primary coils and a pair of secondary coils concentrically wound on a corresponding leg of said core assembly one primary coil superposed about one secondary coil, the secondary coils being immediately wound in stacked relation on the corresponding leg, each primary coil including an inner main winding portion and an outer slide wire portion connected in series, the ends of the main winding constituting first and second terminal means to each primary coil, individual contact means slidably engaging an outer face of said slide wire portions to establish third and fourth terminal means to each primary coil related respectively to said first and second terminal means, said first terminal means being connected to form a common junction of a three phase Y connection, said fourth terminal means being adapted to be connected to the incoming power lines, and said second and third terminals being adapted to be selectively connected to each other to establish a series connection of said primary coils and to the corresponding first and second terminal means to establish a parallel connection of said primary coils.

8. In an arc welding supply a three phase transformer having three similar phase winding assemblies, a three legged core assembly, each of said winding assemblies having a pair of primary coils and a pair of secondary coils concentrically wound on a corresponding leg of the core assembly, the secondary coils being wound in stacked relation immediately upon the corresponding leg, each primary coil including a main winding portion superimposed upon one of said secondary coils and a slide wire portion superimposed thereon and being connected in series, the ends of the main winding portion constituting first and second terminal means to each primary coil, individual contact means slidably engaging corresponding faces of said slide wire portions to establish third and fourth terminal means to each primary coil related respectively to said first and second terminal means, a common mounting means for said contact means adapted to simultaneously and correspondingly position said contact means on the slide wire coil portions, said first terminal means being connected to form a common junction, said fourth terminal means being adapted to be connected to the incoming power lines, and said second and third terminal means being adapted to be selectively connected to each other to establish a series connection of said primary coils and to the corresponding first and second terminal means to establish a parallel connection of said primary coils.

9. In an arc welding supply having a three phase transformer for connection to a power system providing a base voltage and a double base voltage and having three similar winding assemblies carried by a magnetic frame, each of said winding assemblies including a first primary coil and a second primary coil mounted in aligned and adjacent relation on the core member, each primary coil concentrically and coaxially including an inner main primary portion and an outer slide wire portion connected in series, the primary coil terminals presented by the inner main primary portion of the first main primary coil in each pair of primary coils being connected to each other to form a common junction, the movable contacts of the second primary coils being adapted to be connected to the incoming power system, the primary coil terminals presented by the main primary portions of the second primary coils and the movable contacts of the first primary coil being adapted for inter-connection to connect said first and second primary coils in series and in parallel in accordance with the incoming voltage to establish the same output voltage for both the base voltage and the double base voltage.

10. In an arc welding supply having a transformer having close coupled windings adapted to be connected to incoming three phase power lines, a magnetic core assembly having three similar coil carrying portions disposed in laterally spaced aligned relation, a pair of similar coil assemblies on each of said coil carrying portions and adapted to be connected to an incoming phase line, each of said coil assemblies including three coaxially and concentrically arranged coils constituting an inner secondary coil and an intermediate primary coil and an outer slide wire primary coil, the intermediate primary coil and slide wire primary coil of each coil assembly being connected in series, a corresponding exposed face on each of said slide wire coils extending axially of the coil assemblies, individual contact means for each of said slide wire coils, an insulating contact means support connected to the contact means to support the contact means in a corresponding position relative to the engaged slide wire primary coil, and drive means to move the contact means support to simultaneously position said contact means, the primary coils of each of said pair of similar coil assemblies being adapted to be selectively connected in parallel and in series to the incoming three phase power lines to establish a corresponding output voltage for a base line voltage and for double the base line voltage.

11. In an arc welding supply having a transformer having close coupled windings adapted to be connected to incoming three phase power lines, a magnetic core assembly having three similar coil carrying portions disposed in laterally spaced aligned relation, a pair of similar coil assemblies on each of said coil carrying portions and adapted to be connected to an incoming phase power line, each of said coil assemblies including three coaxially and concentrically arranged coils constituting an inner secondary coil and an intermediate primary coil and an outer slide wire primary coil, the intermediate primary coil and the slide wire primary coil of each coil assembly being connected in series, a corresponding exposed face on each of said slide wire coils extending axially of the coil assemblies, a pair of lead screws mounted in spaced and aligned relation to said exposed faces of the slide wire coils, followers mounted on said lead screws and having an axial dimension at least equal to the spacing of corresponding coil turns in each pair of similar coil assemblies, cross plates secured to the followers in accordance with said spacing of corresponding coil turns, individual contact means mounted on said cross plates in engagement with corresponding slide wire coils, and control means to selectively drive said lead screws and position said contact means, the primary coils of each of said pair of similar coil assemblies being adapted to be selectively connected in parallel and in series to the incoming three phase power lines to establish a corresponding output voltage for a base line voltage and for double the base line voltage.

12. In a direct current arc welding machine having a three phase transformer adapted to be connected to incoming three phase power lines and having a full wave rectifier to establish a direct current output suitable for arc welding, a housing having a supporting understructure, a three-legged transformer core vertically mounted on the understructure, a pair of similar coil assemblies on each of the legs of the transformer, each of coil assemblies on each of the legs of the transformer, each of coil assemblies including three coaxially and concentrically arranged coils constituting an inner secondary coil and an intermediate primary coil and an outer slide wire primary coil, the intermediate primary coil and slide wire primary coil of each coil assembly being connected in series, a corresponding exposed face on each of said slide wire coils extending axially of the coil assemblies, a pair of lead screws mounted in spaced and aligned relation to said exposed faces of the slide wire coils, followers mounted on said lead screws and having an axial dimension at least equal to the spacing of corresponding coil turns in each pair of similar coil assemblies, cross plates secured to the followers in accordance with said spacing of corresponing coil turns, individual contact means mounted on said cross plates in engagement with corresponding each slide wire coil, and a crank mounted on the housing and coupled to said lead screws to selectively position the contact means, the primary coils of each of said pair of similar coil assemblies being adapted to be selectively connected in parallel and in series to the incoming three phase power lines to establish a corresponding output voltage for a base line voltage and for a double base line voltage.

13. In a transformer arc welding supply, a magnetic frame structure, a secondary multi-turn coil encircling a portion of the frame structure, a primary coil closely superposed about the secondary coil and consisting of at least sufficient turns to prevent destruction of the coil under normal operating conditions, a slide wire coil closely superposed about the primary coil and connected in series with the primary coil, and a slide wire contact mounted in sliding engagement with said slide wire coil to establish an adjustable constant potential output voltage.

14. In a constant potential arc welding supply transformer, a magnetic frame, a multi-turn secondary coil encircling a portion of the frame structure, a pair of concentric multi-turn primary coils superposed about the secondary coil and constituting a fixed primary portion adapted to establish a sufficient reactance under normal operating conditions to prevent destruction of the coil and an outer slide wire primary portion, and a slide wire contact slidably engaging said slide wire portion to establish an adjustable constant potential output voltage.

15. In a constant potential arc welding supply transformer, a magnetic frame, a multi-turn secondary coil encircling a portion of the magnetic frame, a pair of concentric multi-turn primary coils of relatively fine wire superposed about the secondary coil, at least a portion of outer primary coil constituting a slide wire coil portion and the balance of the primary coils constituting a fixed primary portion of sufficient impedance to prevent damaging primary current flow, and a contact member held in sliding engagement with said slide wire coil portion to establish an adjustable constant potential output voltage.

16. In a direct current constant potential arc welding supply having a three phase alternating current input and a full-wave three phase rectifier, a magnetic frame structure having three leg members, three similar phase windings mounted one to each of said leg members, each of said winding assemblies having a pair of primary coils and a pair of secondary coils concentrically wound on a corresponding leg of the core assembly, the secondary coils being wound in stacked relation immediately upon the corresponding leg and connected to the three phase rectifier, each primary coil including a main winding portion superimposed upon one of said secondary coils and a slide wire portion superimposed thereon and being connected in series, said main winding portion establishing a minimum impedance in each primary coil to prevent excessive current flow in the primary circuit, the ends of the main winding portion constituting first and second terminal means to each primary coil, individual contact means slidably engaging corresponding faces of said slide wire portions to establish third and fourth terminal means to each primary coil related respectively to said first and second terminal means, a common mounting means for said contact means adapted to simultaneously and correspondingly position said contact means on the slide wire coil portions, said primary coil being formed of a large number of turns of fine wire to prevent arcing incident to movement of said individual contact means, said first terminal means being connected to form a common junction, said fourth terminal means being adapted to be connected to the incoming power lines, and said second and third terminal means being adapted to be selectively connected to each other to establish a series connection of said primary coils and to the corresponding first and second terminal means to establish a parallel connection of said primary coils.

17. In a transformer having a multi-layer winding, a core member, a secondary coil disposed about the core member, a main primary coil disposed about the secondary coil with one portion of the primary outwardly spaced from the secondary coil, a slide wire primary coil disposed about the main primary coil and having an exposed outer surface adapted to slidably receive a contact member, and a backing member disposed between the slide wire primary and the main primary coil in alignment with said exposed outer surface to rigidly support the coil turns of the slide wire primary.

18. In a transformer having close coupled windings, a magnetic core member, a multi-turn secondary coil closely disposed around the core member, a main multi-turn primary coil disposed about the secondary coil with one set of opposite portions of the primary coil spaced from the secondary to establish air cooling and tap connection spacing between the coils, a slide wire primary coil coaxially disposed about the main primary coil with corresponding portions spaced from the primary coil, said slide wire primary coil having an outer surface of a spaced portion ground to present a flat and smooth slide wire surface to a brush member, and a backing member formed of electrical insulation mounted immediately behind the slide wire surface portion to rigidly support the coil turns.

References Cited in the file of this patent
UNITED STATES PATENTS

| | | |
|---|---|---|
| 1,430,987 | Hanff | Oct. 3, 1922 |
| 1,722,152 | Meiners | July 23, 1929 |
| 2,265,544 | Peters | Dec. 9, 1941 |
| 2,447,955 | Millholland et al. | Aug. 24, 1948 |
| 2,800,571 | Glenn et al. | July 23, 1957 |
| 2,859,398 | Johnson et al. | Nov. 4, 1958 |
| 2,882,478 | Hobart et al. | Apr. 14, 1959 |
| 2,909,647 | Glenn et al. | Oct. 20, 1959 |